Patented Sept. 3, 1946

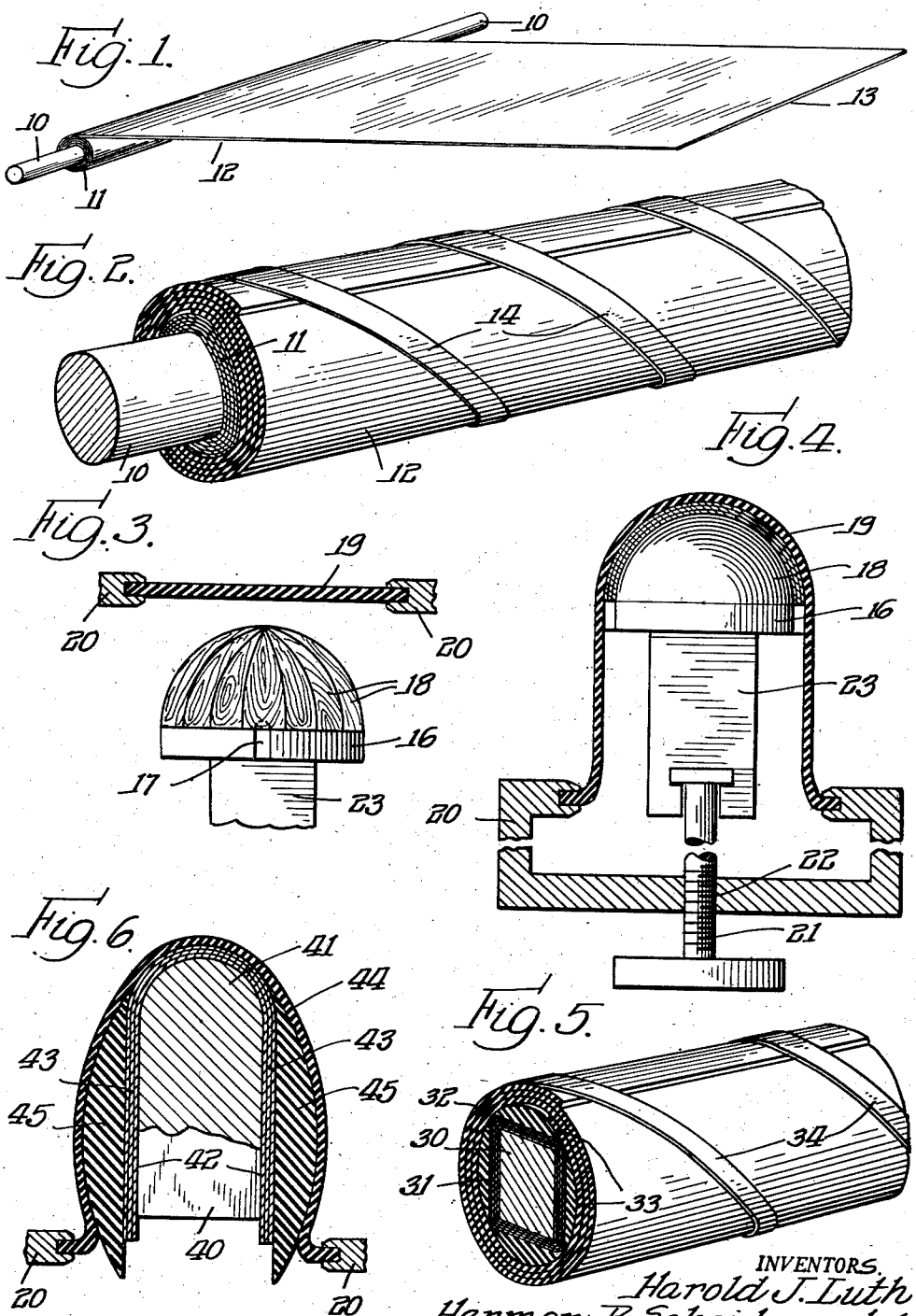

2,406,843

UNITED STATES PATENT OFFICE 2,406,843

PROCESS FOR MOLDING MATERIALS UNDER HEAT AND PRESSURE

Harold J. Luth, Herman B. Scheidemantel, and Sydney R. Krupnick, Muskegon, Mich., assignors to The Brunswick-Balke-Collender Company, Chicago, Ill., a corporation of Delaware Application April 19, 1943, Serial No. 483,540

7 Claims. (Cl. 154—83)

More particularly the invention relates to a process for molding or curing materials, as for example, plywood impregnated with a thermosetting resin, in predetermined shapes.

It has been the practice in the manufacture of molded plywood parts, to shape the plywood about a form, encase the plywood and form in a rubber bag which is then evacuated, and then place the assembly in an autoclave wherein it is subjected to heat and pressure by the use of steam. This process resulted in rapid deterioration of the rubber bag and the resulting molded shape was quite irregular on its surface, necessitating extensive smoothing and finishing time.

We have discovered that the pressure or force which can be developed in rubber, commonly described as the Joule effect, forms a very efficient and economical means of applying pressure at right angles to tangents of curved surfaces. Accordingly it is the general object of this invention to provide a new and improved process for molding materials under heat and pressure by utilizing the characteristic of rubber known as the Joule effect.

When vulcanized rubber is placed under tension and elongated, heat is given off. This is known as the Joule effect. For elongation on the order of 150 to 300 percent the amount of heat is a very considerable percentage of the mechanical work input. For pure gum stocks the maximum mechanical energy in joules is high, the rubber acting more or less like a pure gas, the forces and temperatures having a linear relationship. If a piece of pure gum stock is stretched until elongated, for example, 300 percent, heat will be created and dissipated.

If heat is applied to the rubber when in a stretched condition, the force required to maintain the elongation will be increased. Thus the application of heat to rubber in an elongated condition causes the rubber to exert a contracting force.

It is an object of this invention to provide a process of molding materials under heat and pressure which utilizes this contracting force which occurs in stretched rubber when heated.

Another object is to provide a process for molding materials wherein the material is encased in a sheet of elongated rubber and the assembly is then heated, the heated rubber applying the necessary molding pressure to the material.

Another object is to provide a new and improved process for molding plywood on irregular shapes by utilizing an elongated piece of material to encase the plywood on a form and which material tends to contract and exert pressure on the plywood when the material is heated.

Other objects and advantages will become readily apparent from the following detailed description, taken in connection with the accompanying drawing, wherein:

Fig. 1 is a perspective view showing a sheet of rubber in stretched condition being applied to a cylindrical form onto which resin impregnated paper or plywood had first been placed in layers.

Fig. 2 is an enlarged fragmentary view of the assembly of Fig. 1 after the rubber sheet has been applied and taped thereto.

Fig. 3 is a fragmentary view showing a sheet of rubber about to be stretched over plywood parts on a hemispherical form.

Fig. 4 is a view showing the parts of Fig. 3 in a device adapted to apply force to stretch the rubber sheet over the plywood.

Fig. 5 is a view similar to Fig. 2 but of an assembly wherein the form is square instead of cylindrical.

Fig. 6 is a fragmentary section through an assembly of a form having a moldable material placed thereon and a sheet of rubber stretched over the material, the form having straight portions and inserts placed between the straight portions of the moldable material and the rubber sheet.

While the invention is herein disclosed in a preferred form as utilizing a certain characteristic of rubber, it is to be understood that we do not intend to limit the invention to the use of rubber. It is contemplated that other materials may be substituted for rubber. The scope of the invention will be pointed out by the appended claims.

The process of the invention will first be described in connection with Figs. 1 and 2 of the drawing. Therein, 10 is a cylindrical form of metal, wood or other suitable material. Onto the form 10 has been wound a plurality of layers 11 of impregnated paper, cloth, plywood or any other material it is desired to laminate and form. The material is preferably impregnated with a thermosetting or heat curable resin or adhesive. After the resin impregnated material has been applied to the form. a sheet or blanket 12 of a material such as pure gum rubber stock is rolled onto the form over the moldable material. Preferably the pure gum stock has a high tensile strength, as for example, on the order of 4,000 pounds per square inch. The sheet is elongated, preferably from 150 to 200 percent by applying a force 13 to the free edge of the sheet as the form 10 is rotated to wind the sheet thereon. The material 11 is thereby enveloped in several layers of rubber sheet which is under tension. Generally three or four layers of rubber are applied, after which it may be secured by suitable means such as tape 14.

The heat given off when the rubber is elongated is quickly dissipated. Due to the friction between the layers of rubber, Scotch tape is generally adequate to hold the sheet 12 in place.

We have found that for cylinders on the order of 3 inches in diameter and paper and plywood laminations impregnated with a water soluble phenol formaldehyde resin such as Bakelite #XY 16238 to which about 4 percent of hardener has been added, a rubber blanket approximately $\frac{1}{8}$ inch thick having three or four turns is adequate to develop the desired molding pressure. All that is required is to raise the temperature of the entire assembly of Fig. 2 to a temperature which will cure the resin and enable it to set up. As the temperature of the assembly rises the rubber under tension tends to contract and apply the necessary molding pressure to the laminated part 11. This contracting force increases as the temperature rises and therefore the entire blanket contracts and compresses the laminations together. With a resin as above mentioned, proper curing has been obtained in from one to two hours at temperatures on the order of 250° F.

The heat may be applied in any suitable manner. For example, it may be applied by placing the assembly in a hot room at 280° F.; by immersing it in a liquid which is heated to the proper temperature; by radiant heat from infra red ray lamps; by wrapping it in an electric blanket heated to the necessary temperature; by the use of induced electric currents; or by other convenient means. Regardless of the source of heat, the process involved is the same and comprises the forming and compacting of the laminated material, brought about by the elongated rubber being heated so that the contracting forces in the rubber exert a pressure during the curing cycle, the pressure increasing as the temperature of the assembly rises. Thus the energy added to the rubber due to the increase in temperature is added to the force developed by the rubber due to its elongation.

In Figs. 3 and 4 there are illustrated the parts of an assembly and an apparatus for utilizing the invention in making a hemi-spherical shape or form. A form 16, somewhat hemi-spherical in shape, may be made of wood, plaster of Paris, or any other suitable material. A vertical groove 17 is provided for venting purposes when condensative resins are used for adhesives. Somewhat pie-shaped pieces of plywood 18 are placed upon the form in suitable overlapping layers, the plywood pieces being impregnated or coated on the adjacent surfaces with an adhesive or resin which is heat hardenable. A high tensile rubber sheet 19 is fastened at its periphery to a frame 20 which, as shown in Fig. 4, may be a part of a force applying apparatus. This apparatus includes a screw device 21 which is threaded through an opening 22 in the frame 20 and at its upper end engages a stem 23 on the form 16. By moving the form 16 upwardly from the position shown in Fig. 3 and against the rubber sheet 19 and continuing the upward movement to a position such as shown in Fig. 4 wherein the rubber sheet 19 has been elongated, preferably from 150 to 200 percent, the parts are positioned in an assembly then ready for the application of heat. During this movement of the form, an initial pressure is applied on the laminated plywood.

The entire assembly is then heated as pointed out in connection with the description of the invention in connection with Figs. 1 and 2. Here again, as the temperature of the assembly rises, the contracting forces in the rubber sheet compress the laminations further, so that the necessary molding pressure is obtained while the laminated material is heated. Upon completion of the heating period, the screw 21 may be loosened and the parts removed from the frame 20.

If it is desired to mold square shapes, or other shapes in which there are flat areas of considerable size, the process of the invention may conveniently be used in connection with forms and other parts as illustrated in Figs. 5 and 6.

In Fig. 5 there is illustrated a central rod or form 30 which is of square cross-section. 31 represents a plurality of layers of paper, cloth, wood or other impregnated material wound around the square form to provide a laminated structure. In order to facilitate the application of the contracting forces in the rubber blanket 32, segment shaped members 33 are placed against the flat outer faces of the laminated material so as to form a substantially cylindrical surface onto which the rubber sheet 32 is wound. The members 33 are preferably of a resilient material. The rubber blanket 32 is applied in the same manner as described for the blanket 12 of Figs. 1 and 2, by heat. It is elongated, preferably from 150 to 200 percent, before it is wrapped around the other parts. Suitable means, such as tape 34, is applied to the blanket to hold it in place. This assembly can then be heated in the same manner as described for the assembly of Fig. 2 in order to cure and set the laminated material 31.

In Fig. 6 there is illustrated a form 40 the upper end 41 of which is semi-cylindrical and the lower portion of which consists of flat sides 42.

A laminated resin-impregnated material 43 is placed over the form 40, and between the flat sides 43 and the rubber blanket 44 are placed members 45 which may be termed force transmitting members. These members are preferably of a resilient material having flat sides fitting against the flat portions of the laminated material and curved surfaces engaging the rubber blanket 44. The rubber blanket is mounted on a frame 20 which can be moved downwardly relative to the form 40 in the manner illustrated in Fig. 4. Here again the blanket is elongated preferably 150 to 200 percent while it is applied to the other parts. Thereafter the entire assembly may be heated as hereinbefore described for the purposes of curing and setting the laminated material.

It is believed evident from the foregoing that the advantages of the process are manifold, and that the process can readily be adapted to many different types of materials and many different shapes. The principle of first placing the rubber under tension and applying the heat in such a manner that a substantial component of the tensile force will be applied at right angles to the outer surface of the laminated or other material being molded, can be applied in different ways to utilize the invention. It has been found that if the material to be molded can be hot formed and the adhesive thermosetting (which is most desirable) the force developed in the stretching operation of the rubber sheet should be sufficient to cause elongation of the rubber sheet of 150 to 200 percent. Under these conditions the subsequent heat applied to the assembly will increase the force developed in the sheet to a point where it approaches the ultimate tensile strength of the rubber.

It is believed readily apparent that various modifications can be made in the different parts utilized in applying the process. Instead of rubber, other materials can be used to develop the tension as long as they have the Joule effect or otherwise contract with increase in temperature. Instead of tension sheets, strips or other shapes of the rubber or other material can be used.

Where reference has been made herein to impregnated materials the term "impregnated" has been used to include materials which may be coated on one side, or both, or filled throughout with a resin adhesive or other thermosetting material.

We claim as our invention:

1. A process for making molded plywood articles having external curved surfaces, comprising fitting the plywood material over a form having the desired shape, covering the plywood material with a sheet of vulcanized rubber, stretching said rubber sheet in a direction to apply pressure against the entire surface of the plywood material, and increasing said pressure solely by heating the assembled parts while maintaining the rubber sheet in a stretched condition.

2. A process of making molded shapes of phenol formaldehyde resin impregnated materials, comprising fitting the material onto a form having the desired shape, stretching a rubber sheet over the surface of the material in substantially its final shape, applying a tension to the edge of the sheet to produce 150 to 200 percent elongation in a direction to apply pressure onto the material laterally of the direction of stretch, and increasing said pressure solely by heating the assembly to contract the rubber and set and cure the resin while the materials are subjected to the increased pressure of the rubber sheet caused by the heating thereof.

3. A process of making molded shapes of impregnated materials, comprising fitting the material over a form having the desired shape, stretching a rubber sheet over the surface of the material, applying a tension to the edge of the sheet to produce 150 to 200 percent elongation in a direction to apply pressure onto the material laterally of the direction of stretch, and increasing said pressure solely by heating the sheet to contract the rubber and subject the material to the resulting increased lateral pressure of the rubber sheet.

4. A process of making molded shapes of resin impregnated or glued materials, comprising placing the material on a form having the desired curved surfaces, placing against exterior flat surfaces of the material cured rubber filling members having exterior curved surfaces which join with the curved surfaces on the material, stretching a rubber sheet over the combined curved surfaces of the material and filling members, applying a tension force to the edges of the rubber sheet in a direction to cause the sheet to exert radial forces compressing the filler members and the material throughout the entire surface thereof, and heating the assembly to increase the compressive force exerted by the rubber sheet and to set the resin while the material is so compressed.

5. A process of making molded shapes of settable materials, comprising placing the material on a form having the desired shape, placing exteriorly curved filling members against exterior substantially flat surfaces of the material and thus providing them with exterior curved surfaces, stretching a rubber sheet over the curved surfaces of the material and filling members thus combined, applying a tension force to the edges of the rubber sheet in a direction to cause the sheet to elongate from 150 to 200 percent and to exert lateral forces compressing the filler members and the material against the form, and heating the rubber sheet to increase the compressive force exerted by the rubber sheet against the material.

6. A process for making tubular articles comprising winding onto a core form a sheet of material impregnated with a thermosetting adhesive, winding around said material a sheet of rubber of high tensile strength while elongated from 150 to 200 percent by applying a force to the free edge of the sheet as it is wound onto the material and until the material is enveloped in a plurality of layers of the rubber sheet under tension, and heating the sheet and material to set the adhesive and subject the material to increased pressure caused by the contracting effect of the heat on the rubber sheet.

7. A process for molding articles of material which sets under pressure, comprising shaping the material to the desired form, then stretching over the material an elastic vulcanized rubber member in elongated condition so as to exert a lateral pressure on the material, and increasing said pressure solely by heating said vulcanized rubber member, the vulcanized rubber member when elongated and heated developing internal contracting forces which apply increased lateral pressure onto the material further to compact the material.

HAROLD J. LUTH.
HERMAN B. SCHEIDEMANTEL.
SYDNEY R. KRUPNICK.